Jan. 28, 1930.  O. A. RAPHAEL  1,745,270

EXTENSION TABLE

Filed Jan. 11, 1928

Inventor
OLIVIUS A. RAPHAEL
by Hazard and Miller
Attorneys.

Patented Jan. 28, 1930

1,745,270

UNITED STATES PATENT OFFICE

OLIVIUS A. RAPHAEL, OF LOS ANGELES, CALIFORNIA

EXTENSION TABLE

Application filed January 11, 1928. Serial No. 245,913.

My invention is an extension table of the double-acting type in which by pulling or pushing on one end of the table the opposite end may be caused to draw out or to be forced inwardly.

An object of my invention in an extension table of the above mentioned type is to have the double-acting function performed by a double and reverse threaded screw. This screw is mounted at each end in fixed bearings which function as journals of rotation and has thrust bearings. Attached to each of the double ends there is a nut engaging the threads so that on the movement of one of the table sections inwardly or outwardly, the nut thereon causes the screw to rotate and the screw co-acting on the nut on the opposite table section causes such section to move in synchronism with the first section.

In constructing my invention I mount the journals on a fixed or stationary structure of the table and preferably have a plurality of screws. The leaves may be arranged to slide and have the ordinary type of guide, but as above mentioned, they are acted upon by the screws.

My invention will be more readily understood from the following description and drawings, in which.

Figure 1:
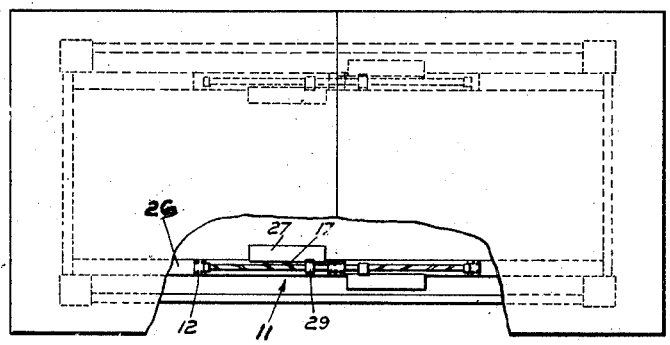
Figure 1 is a plan view of the table partly broken away.
Figure 2:
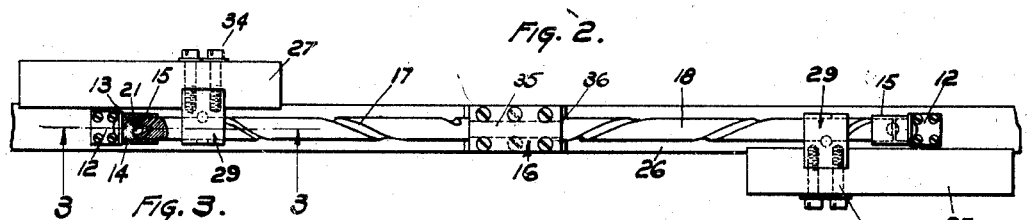
Fig. 2 is a plan of one of the operating screws with parts broken away.
Figure 3:
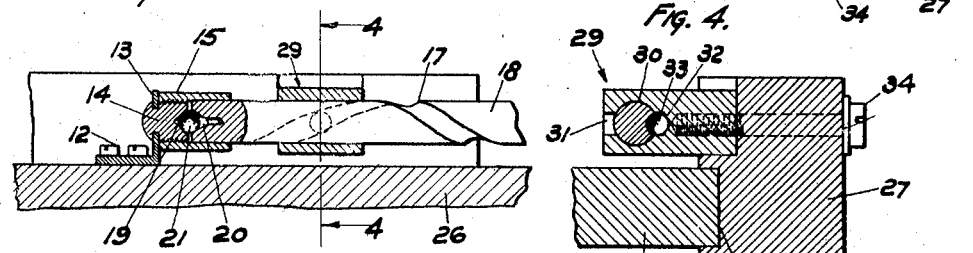
Fig. 3 is a longitudinal vertical section on the line 3—3 of Fig. 2 in the direction of the arrows.
Figure 4:
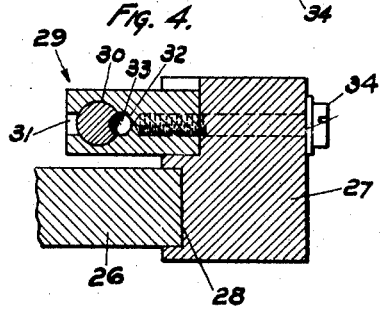
Fig. 4 is a transverse vertical section on the line 4—4 of Fig. 3 in the direction of the arrows.
Figure 5:
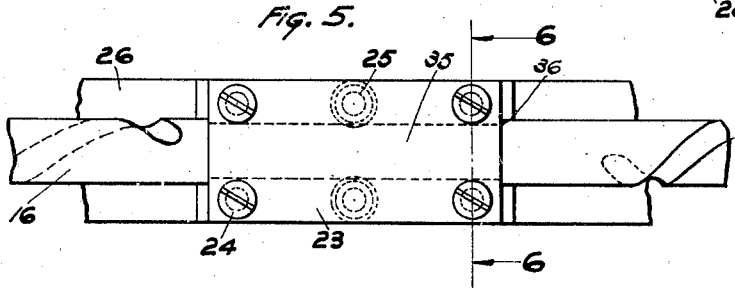
Fig. 5 is a plan of a central bearing or journal for the screw.
Figure 6:
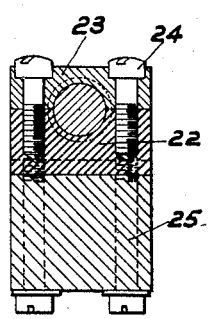
Fig. 6 is a transverse section taken on the line 6—6 of Fig. 5.

In constructing my invention I utilize any suitable type of frame designated generally by the numeral 11 and on this frame I mount supporting brackets 12 which have an upwardly extending base 13, this base having an aperture therethrough with a thrust plug 14 mounted therein. This thrust plug is threaded and carries a thrust collar 15. The screw 16, having reverse threads 17 and 18, is mounted in opposite thrust sleeves, above mentioned, the plug 14 and the end of the screw having complementary sockets 19 and 20 with an antifriction ball 21 mounted therein. (Note particularly Figs. 2 and 3).

The screws are also preferably supported in the center and have a lower bearing block 22 and an upper bearing block 23 secured together by screw bolts 24. The lower block preferably is secured to the frame 11 by screw bolts 25. This construction gives a central support for the center part of the screw.

Mounted on the frame of the table there are guide strips 26, and it is on these strips that the brackets 12 and the thrust block 22 are preferably secured. Then on opposite sides of these strips there are slide bars 27 having a longitudinal groove 28 fitting over the edge of the guide strips 26. These slide bars each carry a nut designated generally by the numeral 29, the nut being constructed by having a circular longitudinal bore 30 therethrough for the passage of the screw and having a lateral bore 31 and a socket 32, in which is mounted a ball 33, the ball being insertable through the bore 32. The nut assembly is secured to the slide bar by bolts 34 or the like.

The manner of action and functioning of my extension table is substantially as follows:

It will be understood that when one end section of the table is drawn on and the frame 11 maintained stationary, the interaction of the nuts on this part of the table and the screws rotate the screws, which rotation of the screws acting on the nuts on the other section of the table causes such other section to move outwardly in synchronism with the movement of the first section. The same action takes place when one of the sections of the table is thrust inwardly. Therefore, it will be seen that by the simple expedient of the screw having the reverse threads, the two sections of the table may be given an equal and opposite movement.

It is desirable to have the screw 16 with a reduced center section 35 so that the shoulders 36 of the screw will engage against the ends of the bearing blocks 22 and 23, this functioning to prevent an endwise shift of the screw.

For large heavy tables it is sometimes advisable to use the center bearing and the end bearings for the screw, but for other types of tables the end bearings by themselves are sufficient and in some cases the center bearing by itself is sufficient. These bearings are merely required to form rotary journals for the screw and to take the thrust caused by pulling on one of the table end sections.

Various changes may be made in the principles of my invention without departing from the spirit thereof, as set forth in the description, drawings and claims.

I claim:

1. An extension table comprising in combination a fixed frame, a screw having reverse threads extending from adjacent the ends towards the center, a plurality of slidable table top sections, each having a nut, said nuts engaging the reversely threaded parts of the screw, each nut having a bore therethrough for the screw and having a ball fitted in the socket engaging the thread of the screw.

2. An extension table, as claimed in claim 1, each nut having a lateral bore at right angles to the bore for the screw, said lateral bore terminating in the said socket containing the ball.

3. An extension table comprising in combination a fixed frame, a screw having reverse threads extending from adjacent its ends towards the center, a pair of bearings secured to the frame for the screw, each of said bearings having a ball taking the thrust of the end of the screw, a pair of table top sections slidable longitudinally, each section having a nut, said nuts engaging the oppositely threaded parts of the screw.

4. An extension table comprising in combination a fixed frame, a screw having reverse threads extending from adjacent the ends towards the center, a pair of nuts for the screw having a longitudinal bore therethrough with a socket on one side of the bore with a ball mounted therein, end bearings secured to the frame for the ends of the screw, each of said bearings having a ball taking the thrust of the end of the screw, and a pair of table top sections slidably mounted, each section being connected to one of the nuts.

5. An extension table comprising in combination a fixed frame, a screw having reverse threads extending from adjacent its ends towards the center, a central bearing for the screw, a pair of nuts, each having a longitudinal bore with a socket in one side of said bore with a ball mounted therein, the ball engaging the threads and a pair of table top sections slidable longitudinally, each section being connected to one of the nuts.

6. An extension table comprising in combination a fixed frame, a screw having reverse threads extending from adjacent ends towards its center, a pair of bearings secured to the frame for the screw, each of said bearings having a ball taking the thrust of the end of the screw, a center bearing for the screw secured to the fixed frame, a pair of table top sections slidable longitudinally, each section having a nut connected thereto, said nut having a longitudinal bore for the screw and a transverse bore with a socket and a ball in the socket engaging the threads of the screw.

7. An extension table comprising in combination a fixed frame having a pair of brackets secured thereto, each bracket having a thrust plug mounted therein with a thrust collar secured thereto, a screw having reverse threads extending from adjacent its ends towards the center, the screw and the thrust plugs having complementary sockets with an antifriction ball at each end of the screw, a pair of table top sections slidable longitudinally, said sections having nuts engaging the threads.

8. An extension table comprising in combination a fixed frame, a screw having reverse threads extending from adjacent the ends towards the center, a pair of brackets secured to the fixed frame, each having a thrust plug with a thrust collar secured thereto, the ends of the screw fitting in the thrust collar and the ends of the screw and the plug having complementary sockets with a ball therein, a pair of table top sections slidable longitudinally, each having a nut having a longitudinal bore for the screw and a transverse bore in a socket with a ball fitting in the socket engaging the threads of the screw.

9. An extension table, as claimed in claim 8, the screw having a reduced center section and a center bearing secured to the fixed frame fitting over said central reduced section.

10. An extension table comprising in combination a frame having a double reverse thread screw of coarse pitch, rotatably mounted therein, a pair of movable end table sections, means to engage each of said sections with parts of the screw having reverse threads, whereby on the movement of one of the table sections the screw is caused to rotate and the reverse thread on the screw causing the movement of the other table end section the threads of said screw being of such inclination that on movement of one of the table sections the screw is caused to rotate.

11. An extension table comprising in combination a fixed frame having a screw with reverse threads of coarse pitch extending from the center towards the opposite ends and having bearings in the frame, a pair of movable table top sections, a nut secured to each of said sections and engaging a thread of the nut, the pitch of the thread and the engagement of the nut causing a rotation of the screw by the longitudinal movement of one of the table top sections, the rotation of the screw causing the other table top section to move in synchronism with the first section in an opposite direction the threads of said screw being of such inclination that on movement of one of the table sections the screw is caused to rotate.

12. An extension table comprising in combination a fixed frame, a screw having reverse threads of coarse pitch extending from adjacent each end inwardly towards the center, bearings including thrust bearings secured to the frame and engaging the ends of the screw, a pair of movable table top sections, means interengaging said sections and the reversely threaded parts of the screw, the said interengaging means and the pitch of the screws causing the screw to rotate when one of the table top sections is moved longitudinally and the rotation of the screw causing the other table top section to move longitudinally in an opposite direction of the first mentioned table top section the threads of said screw being of such inclination that on movement of one of the table sections the screw is caused to rotate.

13. An extension table comprising in combination a fixed frame, a screw having reverse threads of coarse pitch extending from adjacent each end inwardly towards the center, a central bearing secured to the frame and engaging the screw adjacent the center, a pair of movable table top sections and means interengaging said sections and the reversely threaded parts of the screw whereby on movement longitudinally of one of the top sections a rotation of the screw is caused and the rotation of the screw moving the other section longitudinally in an opposite direction to the first section the threads of said screw being of such inclination that on movement of one of the table sections the screw is caused to rotate.

14. An extension table comprising in combination a fixed frame, a screw having reverse threads of coarse pitch extending from the ends towards the center, a central bearing in the frame for the screw, end bearings secured to the frame for the opposite ends of the screw, a pair of table top sections and means interengaging said sections and the reversely threaded parts of the screw, said interengaging means and the pitch of the thread causing the rotation of the screw when one of the screws is moved longitudinally and the rotation of the screw causing the longitudinal movement of the other table top section the threads of said screw being of such inclination that on movement of one of the table sections the screw is caused to rotate.

In testimony whereof I have signed my name to this specification.

O. A. RAPHAEL.